April 17, 1951 J. A. GREGOR 2,549,595
PROCESS OF PREPARING BAKED FOOD PRODUCTS
Filed Sept. 29, 1949 3 Sheets-Sheet 1
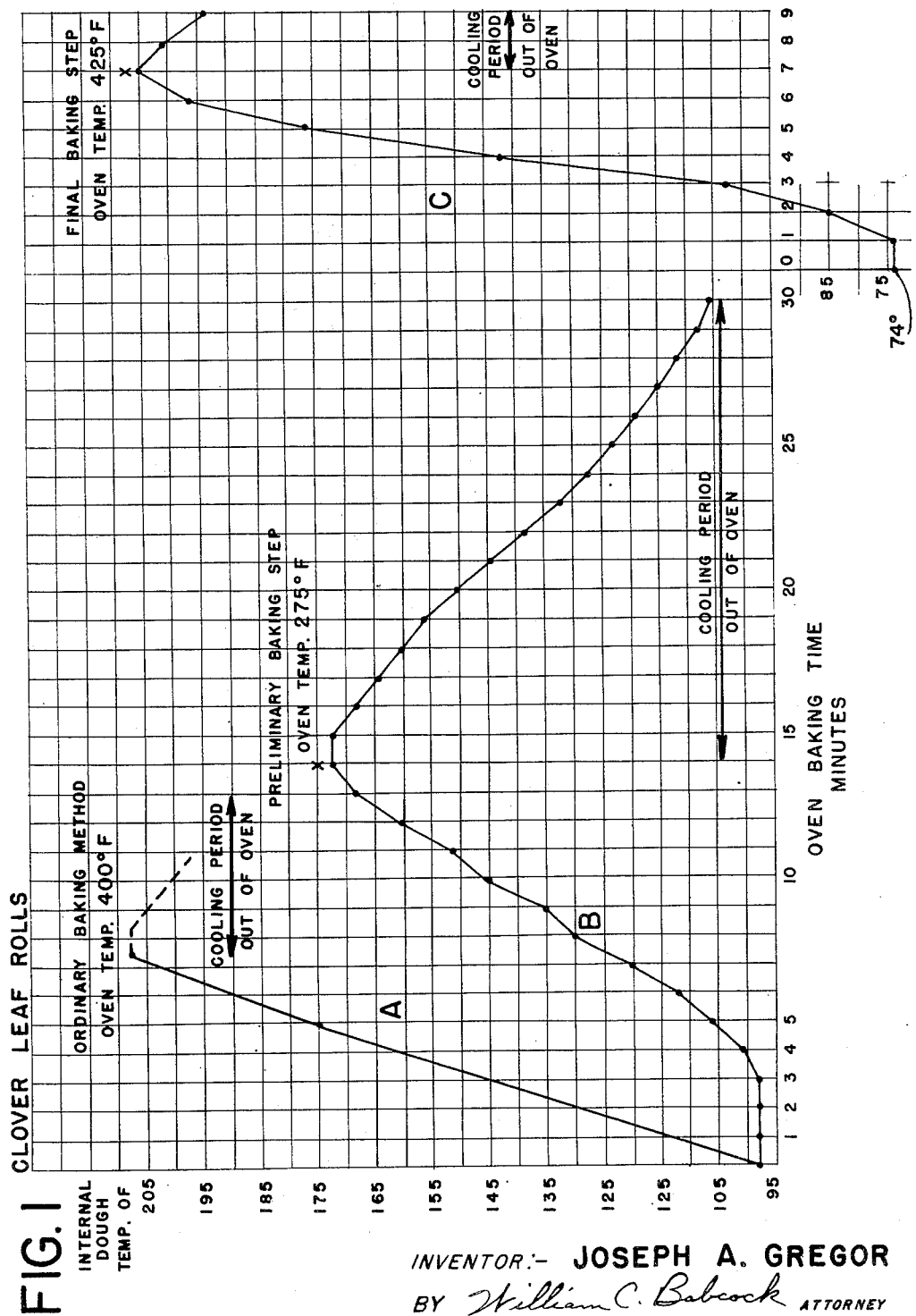
INVENTOR:- JOSEPH A. GREGOR
BY *William C. Babcock* ATTORNEY April 17, 1951     J. A. GREGOR     2,549,595
PROCESS OF PREPARING BAKED FOOD PRODUCTS
Filed Sept. 29, 1949     3 Sheets-Sheet 2
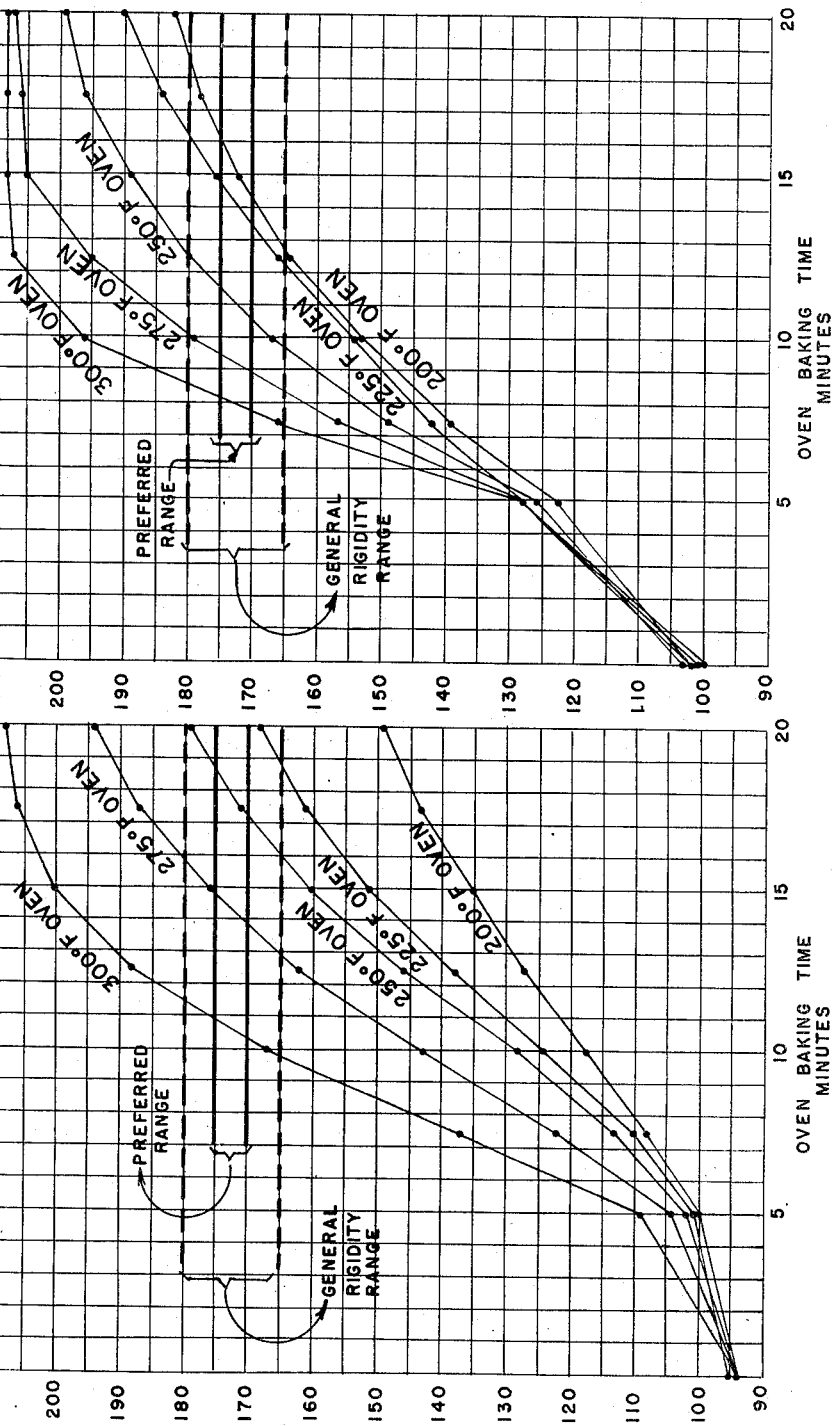
INVENTOR:- JOSEPH A. GREGOR
BY William C. Babcock ATTORNEY

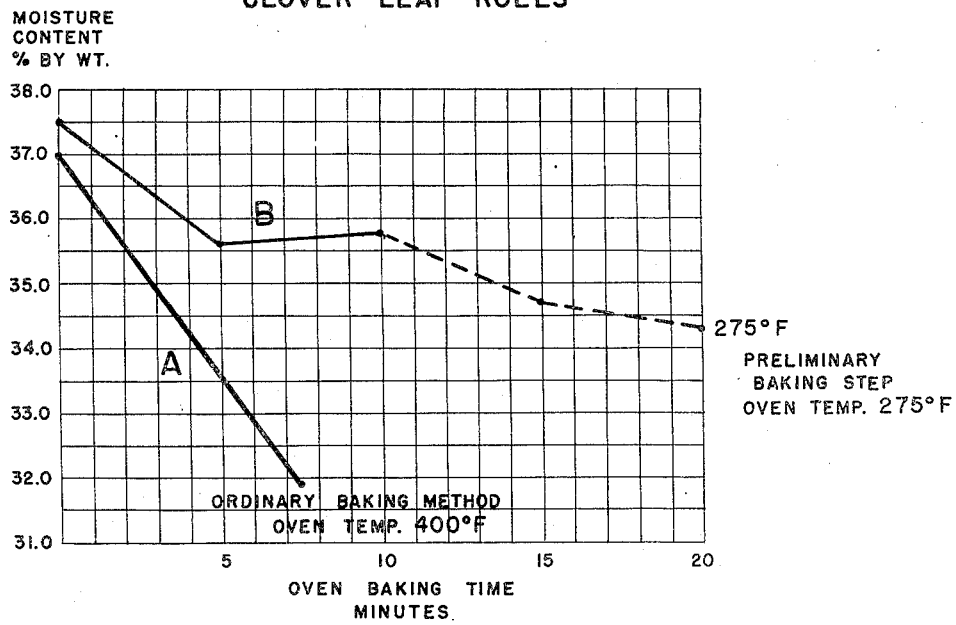

Patented Apr. 17, 1951

2,549,595

UNITED STATES PATENT OFFICE 2,549,595

PROCESS OF PREPARING BAKED FOOD PRODUCTS

Joseph A. Gregor, Avon Park, Fla., assignor to General Mills, Inc., a corporation of Delaware Application September 29, 1949, Serial No. 118,566

9 Claims. (Cl. 99—90)

This invention relates to a process for the preparation of baked food products such as rolls, bread, and the like in a form which can be packaged and distributed to the consumer for final baking in a home oven immediately prior to serving.

Various methods have been proposed in the past for preparation and distribution of baked products to the consumer. According to the most usual methods, the particular product, such as bread or rolls, is completely baked by a commercial baker and is distributed to the consumer through normal retail channels. The consumer can then warm the product briefly in a home oven, if desired, before serving. However, since this ordinary baking process has been carried to completion by the baker, the additional warming step by the consumer to the right point of warmth without burning is difficult. Often the product is dried to such an extent that it will not remain soft and palatable even through a normal meal. Such a rewarmed product is distinctly inferior to a freshly baked item which is served soon after it leaves the baker's oven.

In an attempt to improve upon the normal methods of distribution and preparation for consumption, various proposals have been made. One such proposal involves the sale of prepared mixes which make it possible for the housewife to bake as needed the desired products herself. While this approach is highly successful in connection with some types of products, it has not proved entirely satisfactory for the baking of yeast dough products because the proper handling and fermentation of the yeast doughs require skill and are not within the range of general experience of the average housewife.

Another proposal which has been made involves the preparation of a dough which is frozen and distributed under refrigeration for ultimate baking by the consumer. However, some additional processing is necessary in which judgment is required. Previous applications of this procedure to yeast products have required refrigeration of the dough for retarding the yeast or leavening action, which means that the consumer must supervise and control the yeast action and final raising of the dough prior to baking. For these reasons, none of the proposals previously made has given the consumer an absolutely accurate and simple means of baking a dough product immediately prior to the desired time of serving.

With these defects of the prior art in view, one object of the present invention is to provide an improved process for the preparation and distribution of baked food products.

Another object is the provision of a process by which baked food products may be made and distributed in a form requiring no preparation by the housewife prior to final baking.

A further object of the invention is to provide such a process which is applicable to baked products containing yeast or a chemical leavening agent.

Another object is the provision of a packaged baked product in which all critical portions of the baking operation have taken place prior to distribution to the consumer.

Still another object is the provision of a packaged food product which has been subjected to a preliminary baking step in which the desired leavening action is completed and arrested, so that the consumer can quickly complete the baking of the product in a home oven, without particular preparation or chances for error.

A further object is the provision of a method of baking yeast raised products to a point of full volume and rigidity without any semblance of crust color.

Other objects and advantages of the invention will be apparent from the following specification in which certain preferred embodiments of the invention are described.

In general, I have found that the above stated objects can be accomplished by dividing the actual oven baking operation into two steps, one of which is carried out by the commercial baker before distribution of the product, while the second and final step is performed by the consumer. The preliminary baking step should be sufficient to complete the gelatinization of the starch which is present in the flour, but should be discontinued before external browning or crusting of the dough is complete. This browning is caused by caramelization of the sugar at the surface of the dough. In carrying out the process, I have found that certain baking conditions can be adjusted so that the external browning and crusting are delayed until the starch gelatinization is complete and the product has assumed the necessary rigidity. By this adjustment of the baking conditions I can also delay the loss of moisture from the dough so that when the product which results from this preliminary baking step is finally baked and served by the consumer, it will be moist and at the peak of freshness. In general, this preliminary baking step is carried out at substantially lower oven temperatures and for a longer time, than any ordinary baking method previously used for the production of ordinary baked dough products.

The final baking step can then be carried out by the consumer without particular preparation, under conditions which will insure the formation and browning of the crust, without the reduction of the moisture content below the desired level.

As a result, the baking operation by the consumer yields a completely baked, browned, and crusted product which is substantially similar in all respects to a freshly baked roll prepared by ordinary bakery methods. Preferably, this final baking step should be carried out at a relatively high oven temperature for a short period of time.

In order that those persons skilled in the art may better understand the nature and scope of my process and products and the best methods of carrying out the same, a detailed description of the invention will now be given, with particular reference to the accompanying drawings in which, Figure 1 is a graph showing the internal dough temperatures involved in an ordinary baking method, compared with the temperatures involved in my new method.

Fig. 2 is a graph showing the inter-relationship of certain baking factors, specifically baking time and oven temperature, for a given initial dough temperature.

Fig. 3 is a graph similar to Fig. 2 showing the interrelationship of baking time and oven temperature for a higher initial dough temperature, and Fig. 4 is a graph illustrating the loss in moisture content in an ordinary baking operation, compared with the moisture loss during the method of the present invention.

In carrying out the method of the present invention, I find that it is necessary to carry out the preliminary baking step under conditions which will insure that the yeast or leavening action is completed and arrested and that the dough is substantially fully cooked so that the resulting product maintains its shape, can be handled, and does not collapse after removal from the oven. To achieve the necessary rigidity, substantial gelatinization of the starch must be obtained. At the same time, as stated above, it is desirable that the baking be arrested or discontinued before completion or browning of the usual outer crust can occur.

In a normal baking operation, of course, the oven temperature is high enough and the baking time is long enough so that the starch is fully gelatinized, the yeast action is completed and arrested, the crust is fully formed and browned, and the moisture content is reduced to the normal level for a completely baked product.

According to the present invention, the baking conditions involved in the process are so adjusted that the necessary starch gelatinization can be achieved before the external browning or complete crust formation takes place. The exact conditions under which this result can be achieved will depend upon a number of factors. One of the most important of these factors is the internal dough temperature, i. e., the actual temperature of the dough at the middle of the roll or other product which is being baked.

For a given product, depending upon the combination of ingredients used, there is a substantially definite temperature at which gelatinization of the starch will be completed. In French doughs, for example, which contain essentially flour, sugar, salt, water, and yeast, the starch gelatinization will be substantially complete when the internal dough temperature reaches 165° F. On the other hand, in sweet doughs, which are softer in character, and which may contain as much as 20% of shortening and other enriching ingredients, it may be necessary to reach an internal dough temperature of 180° before such gelatinization is completed. To insure complete termination of all yeast action and adequate pasteurization of the dough it is also essential that the internal dough temperature should reach at least 160° F. for 3 minutes or 170° F. for 0.3 minute. Thus one requirement of the present process is that the baking conditions are so adjusted that the internal dough temperature of the baked product reaches a point substantially in the general rigidity range from 165° to 180° F., and preferably at least 170° to 175° F.

By way of contrast, in an ordinary baking process, such as carried on by a commercial baker, the time and temperature and other conditions of the baking operation are such that the internal dough temperature rapidly passes through this range and normally approaches 209 to 210° F., i. e., a temperature slightly below the boiling point of water. This condition is indicated generally by curve A in Fig. 1, from which it is apparent that a clover-leaf roll dough, baked by ordinary methods at 400° for 7½ minutes will have reached an internal dough temperature of 208° by the end of the process. It will be noted in this case that the starch gelatinization temperature of approximately 170° F. will have been reached after 4½ minutes. In this ordinary baking process, however, the baking conditions are so stringent that by the time the internal dough temperature has reached this gelatinization point of 170° F., the external surface of the roll will have become substantially browned and crusted.

According to the present invention, on the other hand, it is possible to adjust one of the baking conditions, such as oven temperature, so that the necessary internal dough temperature can be reached to achieve starch gelatinization, before crusting or browning has been completed. The preferred method of achieving this result is to adjust the oven temperature to a substantially lower range and to adjust the baking time accordingly. For example, an oven temperature somewhere in the general range between 250° and 325° F., and preferably between 275° and 300° F., will delay both the loss of moisture from the dough and the formation and browning of the outer crust so that the gelatinization point of 170° will be reached throughout the roll before such browning or crusting occurs.

The actual time required for this preliminary baking step at reduced oven temperature will depend upon the exact oven temperature chosen and also on such other factors as the proofing conditions, the initial dough temperature at the start of baking, the dough absorption (i. e., the moisture content of the dough calculated to a moisture-free basis at the time the dough goes into the oven), and the unit size or actual dough thickness. As shown by Fig. 2, for example, if the oven temperature is at the lower end of the range from 250 to 325° F., it will take a substantially longer time for the internal dough temperature to reach the general rigidity or gelatinization range of 165 to 180° F. than in the case where the oven temperature is nearer the upper limit of the specified range, other factors remaining constant.

Similarly, a comparison of Fig. 2 and Fig. 3 will indicate that for a given oven temperature, the baking time required for the internal dough temperature to reach the starch gelatinization point will depend upon the initial dough temperature. With the lower dough temperatures of Fig. 2, a substantially longer baking time is required to reach the gelatinization range.

The additional factors mentioned above, such as dough absorption and dough thickness, together with the exact dough formula which is used for a particular product, will combine to affect the result in similar fashion. Because of the relatively large number of these variables, and because of their definite interdependence, it is a difficult matter to specify generally and exactly the range of operative conditions for all possible applications of the present process. As a practical matter, however, it is relatively easy to determine the operative range, once the teachings of the present invention are available.

One method of determining the proper range of conditions is to observe, during the baking operation, the actual internal dough temperature at the center of one of the products being baked. Such observation is possible in any case by the use of a simple recording thermometer of known type, which can be inserted in the product being baked and which will record the maximum temperature reached inside the product during a particular baking operation. With the oven temperature set somewhere within the specified range of 250 to 325° F., and preferably between 275 and 300° F., it is then possible to continue the baking operation until the gelatinization range of 165 to 180° is indicated on the thermometer. The baking operation can then be discontinued without permitting the dough temperature to increase to the 209° range, which is common in ordinary baking operations. This termination of the preliminary baking step should of course take place before substantial browning or crust formation can occur. The use of oven temperatures in the specified range insures the proper carrying out of the process and the gelatinization of the starch prior to such crusting and browning.

Another method of determining, in practice, the point at which the desired preliminary baking step is complete is to select an oven temperature within the specified range and then continue the baking operation at that temperature as long as it is possible to do so without formation of an observable crust color. By noting the baking time in an experimental run according to this method, one can duplicate the results later as desired. Practical experience with the present invention can be acquired and is desirable, just as with ordinary baking methods.

In either case, it is important that the preliminary baking operation be discontinued while the moisture content of the product is substantially higher than that which the same product would have if completely baked by ordinary methods. One reason for this requirement is to insure that the moisture content of the product after the preliminary baking step is high enough, so that the final baking step in the consumer's home oven will result in a product of adequate moisture content.

Thus it is desirable that the particular product at the end of the preliminary baking step shall retain substantially twenty-five to fifty per cent of the moisture which would otherwise have been lost in an ordinary baking operation. Stated in another way, a dough of given initial moisture content or dough absorption, when baked by ordinary methods, will reach a lower final moisture content of definite amount. Of this total difference in moisture content obtained in an ordinary baking operation, the baking conditions of the present process are to be so adjusted that the moisture loss will be only fifty to seventy-five per cent complete.

This situation is illustrated graphically in Fig. 4 in which the moisture loss of a particular product (namely the product of Example 3 below), when subjected to an ordinary baking operation, is compared with the moisture loss of the same product when submitted to the preliminary baking process. Thus curve A indicates that with an initial moisture content of thirty-seven per cent, the ordinary baking process, carried out in an Edison oven at 400° F. for 7½ minutes resulted in a product having 31.9 per cent moisture content. Curve B indicates, on the other hand, that with approximately the same initial moisture content, the product yielded by the preliminary baking step of the present invention (baked at 275° for ten minutes) will have a substantially higher final moisture content of 35.7 per cent, thus insuring sufficient moisture when this preliminary product is subjected to the further or final baking step in the consumer's home oven. This moisture allows for complete baking and browning of the product with adequate moisture in the final product for the optimum in freshness. In other words, the product which is finally served by the consumer, in the case of the present invention, has the appearance, structure, and moistness of a roll which has been freshly baked by ordinary methods in a commercial bakery.

The particular proofing conditions play an important part in the present process and can be affected by such factors as day-to-day variations in shop temperature, proof box temperature, dough consistency, make-up punishment and unit weight, as well as formula richness. While experience will determine the specific range in proofing time, for particular conditions, it may be said, as a general rule, that proofing time should be approximately one-half to two-thirds the regular proofing time used for ordinary baking. Where a large "oven spring" is to be expected for a given formula, a relatively short proof may be desirable. Excessive proof will cause the product to shrink or wrinkle after the baking period. In general, proof box temperature should be as warm as usual, and preferably warmer, i. e., 90° to 105° F.

In order to explain further the nature and details of the present invention, the following specific examples are given.

EXAMPLE 1

Mix any standard bread or roll formula containing flour, sugar, salt, water, and yeast, and other commonly used ingredients, using any normal bakery procedure for mixing of the dough.

After initial fermentation, the dough is pinched off or divided into the desired sizes, shaped and placed in a standard proofing cabinet until the dough is fully raised. When this proofing step is complete, the product is placed in an oven in which the internal oven temperature is adjusted to 250 to 275°. The product is left in the oven until the desired starch gelatinization has been obtained and the yeast's growth has been destroyed. This will ordinarily require a baking time of 8 to 12 minutes, depending on the factors already discussed. The product then is removed from the oven before external browning occurs, and may be cooled at room temperature or in a temperature controlled cooling room. When cooled, the product is ready for packaging and distribution to the consumer.

The resulting product may be kept under ordinary household refrigeration for two or more weeks, and for substantially greater periods of time if stored in a deep freeze cabinet or locker. The packaged product will maintain its shape inasmuch as its internal structure is substantially complete. However, the product is devoid of any substantial crust or external browning. Thus the product may be placed in the home oven of the particular consumer and subjected to a final baking step which is sufficient to heat the product, brown and further form the desired crust, and complete the desired reduction in moisture content. A kitchen range oven temperature of 425° to 450° F. and a baking time of 7 to 10 minutes are recommended for this final baking operation by the consumer.

EXAMPLE 2

With a standard bakery mixer, cream with a paddle the following ingredients:

|  | Ounces |
|---|---|
| Sugar | 8 |
| Salt | 2 |
| Powdered skim milk | 4 |
| Whole eggs (cold) | 6 |
| Shortening | 8 |

Whip the mixture at high speed for approximately three minutes.

Dissolve one and one-half ounces of yeast in two quarts of lukewarm water (105° F.).

With the dough hook on the mixer, add eight pounds of flour to the creamed and whipped initial mixture. Then gradually add the yeast and water solution. Mix the resulting dough at intermediate speed for eight minutes until the dough is fairly stiff and cleans the mixer.

Place the dough in a trough and ferment at 100° F. for one and one-half hours. Then pinch off the dough into rolls and make them up into the desired shape. Place the rolls in the proof box at substantially 100° F. for about one hour or until light.

With the oven baking chamber temperature adjusted to 280° F., place the rolls in the oven for ten minutes. Remove the rolls at the end of this period and allow them to cool for five minutes, after which they may be removed from the pans, cooled to room temperature, and then packaged.

If desired, a fine water spray may be applied over the rolls after the first five minutes in the baking oven. This will assist in delaying moisture loss and will provide a better outer surface or skin for the rolls.

The resulting product will have the necessary rigidity to maintain its shape during normal retail distribution and consumer storage. The starch will be substantially gelatinized and yeast action completed and arrested, so that the consumer need make no special preparations nor have any particular experience in the handling of these yeast dough products before the final baking step in a home oven. It will only be necessary for the consumer to place the rolls in an oven set at from 425° to 450° F. for seven to ten minutes, or until the desired browning of the crust is achieved. From the graph of Fig. 3, it will be apparent that the preliminary oven temperature and baking time specified in this example, in combination with the initial dough temperature at the end of the proofing step and the beginning of the baking step will insure that an internal dough temperature within the necessary gelatinization range is reached. Furthermore, at the end of the preliminary baking step there will be no substantial browning of the surface, and, in fact, no particular crust other than a pale, thin and flexible skin.

EXAMPLE 3

Dinner Rolls and Buns (Straight Dough Method)

|  | Percentage Basis |  | Gallon Basis |
|---|---|---|---|
| No. 1 | 10 | Granulated Sugar | 1 lb. 5 ozs. |
|  | 12 | Shortening | 1 lb. 10 ozs. |
|  | 2 | Salt | 4 ozs. |
|  | 3 | Milk Powder | 6½ ozs. |
|  | 6 | Whole Eggs | 13 ozs. |
| No. 2 | 2 | Yeast | 4 ozs. |
|  | 61 | Water (variable) | 1 gallon. |
| No. 3 | 100 | Patent Flour | 13 lbs. 8 ozs. |

*Method.*—Place No. 1 in a mixing bowl. Use the dough mixing arm and cream well. Then add No. 2 and No. 3 and mix on low-to-medium speed until dough is smooth (approximately 5 minutes). Do not fully develop the dough by mixing.

*Temperature.*—Not less than 90° F. when mixed.

*Fermentation time.*—Allow dough to ferment at room temperature (preferably 75° to 80° F.) for 1 hour and 45 minutes to 2 hours (one full rise without punching). Then take dough to the bench and make up immediately.

*Proofing.*—Proof box temperature should be as warm as usual, and preferably warmer. From 98° to 105° F. is best. Proof rolls approximately three-fourths as high as regular roll production. Slightly shorter proof is advisable as the rolls expand considerably as they bake. Do not proof until "light-to-the-touch." When properly proofed, the rolls are firmer to the touch than rolls from regular production.

*Baking.*—Oven temperature should be 275° to 300° F. The oven should have a solid heat at these temperatures. Bake as long as possible at this temperature without coloring the rolls. When properly baked, the rolls should be white in color, fully formed, and have good body for ease in handling.

*Handling after baking.*—Allow rolls to cool for approximately 20 minutes. Then remove from baking pans to thoroughly washed or paper-lined trays. Do not leave the rolls in baking pans too long, or rolls will "sweat" and become difficult to remove. Do not cool rolls in areas subject to outside air drafts that could contribute mold contamination. Wrap in transparent moisture resistant protective material, e. g. Pliofilm.

Consumer baking

Place in a home oven at from 425° to 450° F. for 7 to 10 minutes or until the desired browning is achieved.

EXAMPLE 4

Dinner Rolls and Buns (Sponge Dough Method)

Sponge 65 lbs. patent flour
60% water
3% yeast
⅜% mineral yeast food
½% malt (low diastatic)

(Percentage of water in sponge is based only on sponge flour.)

*Method.*—Dissolve yeast, yeast food, and malt in the water. Then add flour and mix until sponge is smooth (approximately 4 to 5 minutes).

Sponge temperature: 76° to 78° F.
Sponge time: 4½ hours.

Dough 35 lbs. patent flour
60% water (variable)
1¾% salt
10% sugar
3% milk powder
10% shortening (Percentage water in dough is total absorption based on both sponge and dough flour.)

*Method.*—Return fermented sponge to mixer. Add all of dough ingredients and mix dough until very well developed. Firm dough consistency is preferred and should be adjusted to promote ease in mechanical make-up.

Dough temperature: 80° F.
Time: no dough time—take to make-up machines immediately.

The proofing, baking, and handling after baking will be the same in this case as in Example 3.

Consumer baking

Place in a home oven at from 425° to 450° F. for 7 to 10 minutes or until the desired browning is achieved.

The process and products described in the foregoing specification accomplish the objects of the present invention and make it possible to distribute to the consumer a baked food product which can be subjected to a final baking step in a home oven without particular preparation or experience on the part of the user. The products of the preliminary baking process according to the invention may be kept for substantial periods of time before use, particularly when subjected to refrigeration or deep freezing. Even without such refrigeration, the products have a normal shelf-life of four to five days which permits their distribution by the same methods employed for ordinary baked products. Furthermore, the products are of definite advantage to the consumer, since it is possible for the consumer to keep a supply of the products under refrigeration and complete the final baking step at any time, without advance preparation, when the consumer desires to serve a hot, oven-fresh product.

Since minor variations and changes in the exact details of the process will be apparent to persons skilled in this field, it is intended that this invention shall cover all such changes and modifications as fall within the spirit and scope of the attached claims.

Now, therefore, I claim:

1. The method of preparing baked food products which comprises preparing a dough comprising flour, sugar and water, baking the dough until gelatinization of the starch is complete, adjusting at least one baking condition selected from the group consisting of initial dough temperature, oven temperature, baking time, dough absorption and dough thickness and thereby delaying external browning of the dough until the starch gelatinization is complete, and discontinuing the baking before substantial caramelization of the sugar in the crust takes place.

2. The method of preparing baked food products which comprises preparing a dough including flour, sugar, water, salt, and a leavening agent, proofing the dough, baking the dough until gelatinization of the starch is complete and further action of the leavening agent is arrested, adjusting at least one baking condition selected from the group consisting of initial dough temperature, oven temperature, baking time, dough adsorption and dough thickness and thereby delaying external browning of the dough until starch gelatinization is complete, and discontinuing the baking before such external browning takes place.

3. The method of preparing baked yeast products for distribution which comprises mixing a yeast dough, proofing the dough and baking the dough in a heated oven until the starch is gelatinized and the product is pasteurized, adjusting at least one baking condition selected from the group consisting of initial dough temperature, oven temperature, baking time, dough adsorption and dough thickness and thereby delaying external browning of the dough and substantially reducing the moisture loss during the baking step to 25–50% of the moisture loss which would result from ordinary baking of the same dough at customary 400° F. oven temperatures, and discontinuing the baking before the loss in moisture content reaches the point at which caramelization of the sugar in the crust can occur.

4. The method of preparing baked yeast products for distribution which comprises mixing a yeast dough, proofing the dough until substantially fully risen, baking the dough until the starch is gelatinized and the product is pasteurized, adjusting at least one baking condition selected from the group consisting of initial dough temperature, oven temperature, baking time, dough absorption and dough thickness and thereby delaying external browning of the dough and substantially reducing the moisture loss during the baking step, and discontinuing the baking before the loss in moisture content reaches the point at which caramelization of the sugar in the crust can occur.

5. The method of preparing bakery products which comprises preparing a dough comprising flour, yeast, sugar and water, baking the dough until gelatinization of the starch is complete and the dough is pasteurized, and discontinuing the baking while the moisture loss of the dough is substantially only 25–50% of the moisture loss which would be obtained in making of a fully baked and crusted product from the same dough and before substantial browning of the dough has taken place.

6. The method of preparing baked dough products which comprises mixing a dough, baking the dough at an oven temperature in the range from 250–325° F. until starch gelatinization is substantially complete, and discontinuing the baking just before external browning of the dough occurs.

7. The method of preparing baked dough products which comprises mixing a dough, baking the dough at an oven temperature in the range from 275–300° F. until starch gelatinization is substantially complete, and discontinuing the baking just before external browning of the dough occurs.

8. The method of preparing baked yeast dough products which comprises mixing a yeast dough, proofing the dough, baking the dough at an oven temperature in the range from 275–300° F. until starch gelatinization is complete, and discontinuing the baking just before external browning of the dough occurs.

9. The method of preparing baked dough products which comprises mixing a dough, baking the dough at reduced oven temperature substantially less than 400° F. until the starch is gelatinized, and discontinuing the baking before external browning takes place.

JOSEPH A. GREGOR.

REFERENCES CITED

The following references are of record in the file of this patent:

UNITED STATES PATENTS

| Number | Name | Date |
|---|---|---|
| 1,181,317 | Katz | May 2, 1916 |

FOREIGN PATENTS

| Number | Country | Date |
|---|---|---|
| 175,564 | Germany | Nov. 1, 1905 |
| 511,105 | Germany | Oct. 27, 1930 |

OTHER REFERENCES

Food materials and equipment, April 1947, page 16.

McPherson et al., Food Industries, Sept. 1948, pages 95–97.